Sept. 23, 1924.  
H. E. GRABAU  
1,509,202  
METHOD AND APPARATUS FOR PRODUCING STRANDS FOR TIRE FABRIC  
Filed Jan. 30, 1919  
3 Sheets-Sheet 2
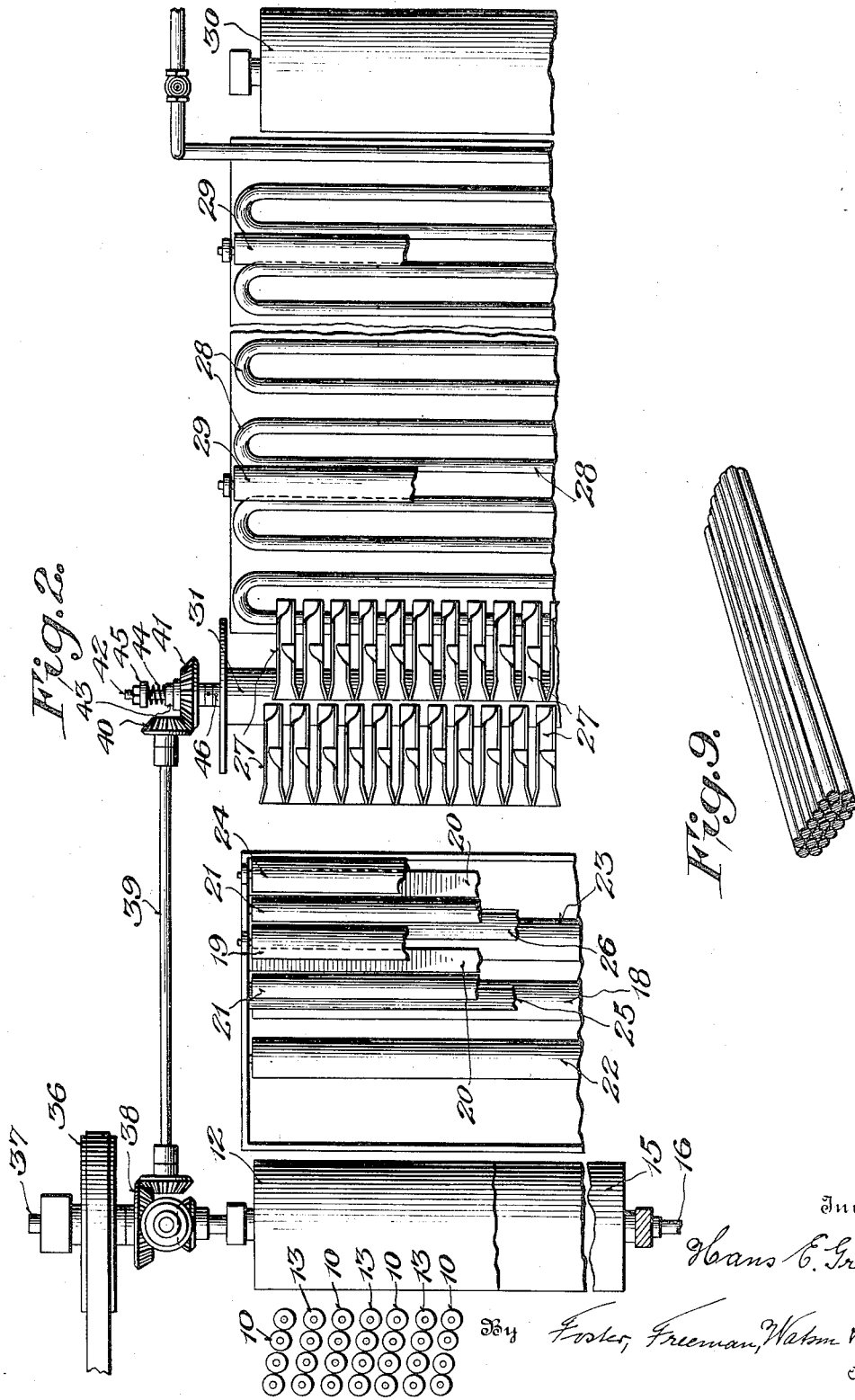

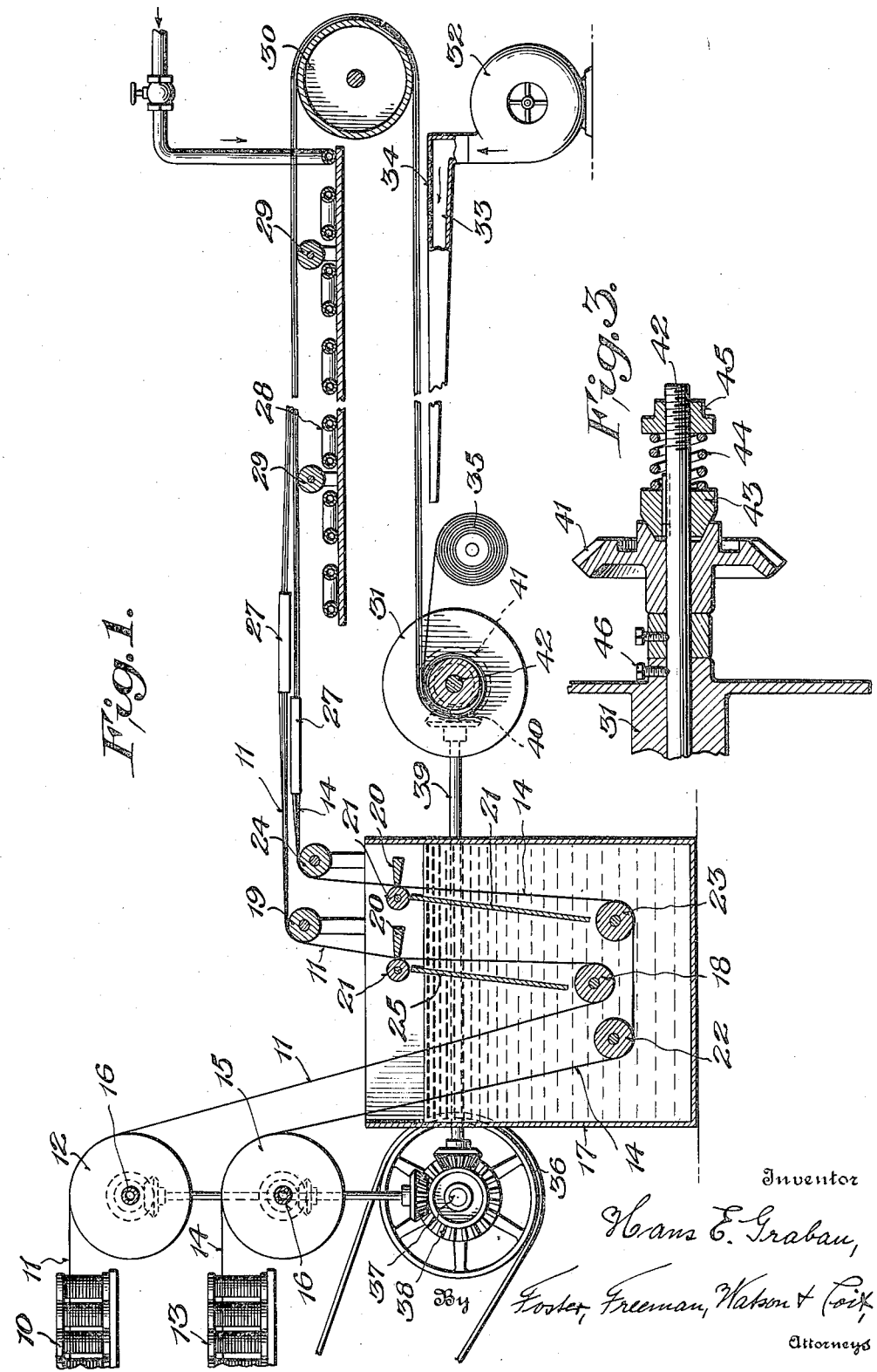

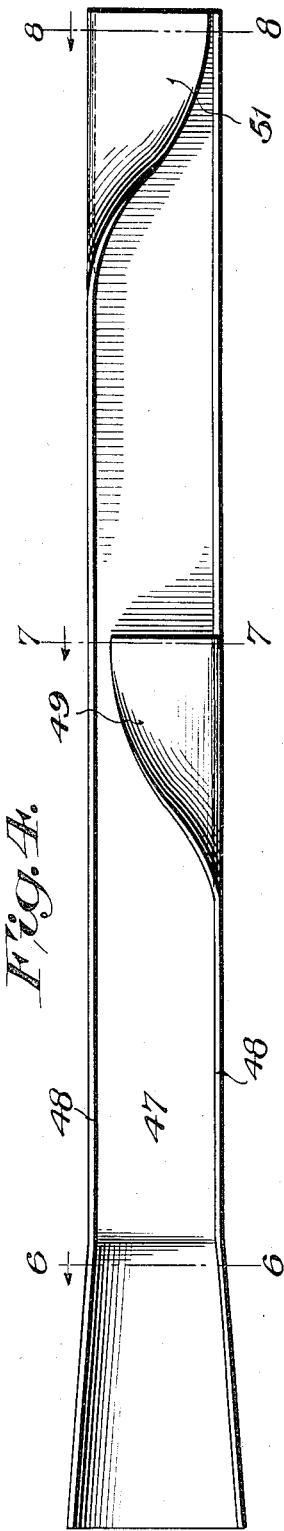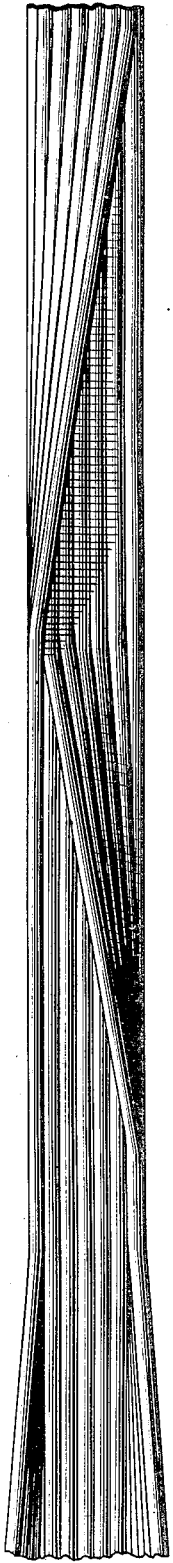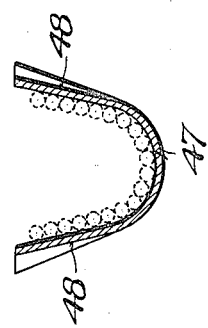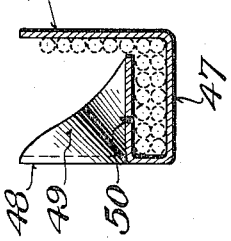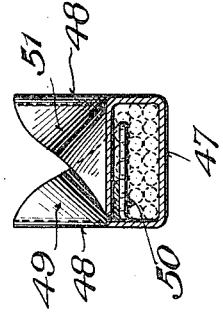

Patented Sept. 23, 1924.

1,509,202

UNITED STATES PATENT OFFICE.

HANS E. GRABAU, OF NEW YORK, N. Y., ASSIGNOR, BY MESNE ASSIGNMENTS, TO MULTIPLE CORD CORPORATION, OF NEW YORK, N. Y., A CORPORATION OF DELAWARE.

METHOD AND APPARATUS FOR PRODUCING STRANDS FOR TIRE FABRIC.

Application filed January 30, 1919. Serial No. 273,969.

*To all whom it may concern:*

Be it known that I, HANS E. GRABAU, a subject of the German Empire, who has taken out his first naturalization papers, and residing at New-York city, New York County, New York State, have invented certain new and useful Improvements in Methods and Apparatus for Producing Strands for Tire Fabric, of which the following is a specification.

The present invention relates to a method and apparatus for making a material comprising adhering threads preferably arranged in superposed layers. More specifically the invention has for its object to produce strands of threads in which the threads are held together by an adhesive such as rubber.

In the manufacture of a tire fabric of the type disclosed in the copending application, Serial No. 211,378, strands or bundles of threads are interwoven with cross threads, the latter being spaced. Preferably, the strands comprise a plurality of threads arranged in superposed layers. If the fabric is rubberized after being woven, it is found that the rubber does not penetrate to the interior of the strands. As a result, the interior threads of the strands are not rubberized, and consequently, are not protected against chafing, although there is little chafing between the threads of the strands in this type of fabric. If the individual threads constituting the strands are rubberized and then grouped as strands in the weaving of the fabric, all the threads of the strands will be rubberized, but the labor required to handle and place the threads in the fabric to form the strands renders this method impracticable. Furthermore, considerable space is required in order to properly handle the threads, which is another defect of this method.

According to the present invention, all the above mentioned defects are overcome by rubberizing the threads and arranging them in bundles while the rubber is adhesive thereby forming strands consisting of adhering threads. After the rubber or adhesive has dried the strand may be handled as though it were a single large thread, thus facilitating the weaving of the fabric.

Other objects and features of novelty will be apparent from the description taken in connection with the drawings in which:—

Figure 1 is a more or less diagrammatic view illustrating in elevation an apparatus constructed in accordance with the present invention, certain of the parts being shown in section;

Figure 2 is a plan view of the apparatus;

Figure 3 is a sectional elevation illustrating a form of non-positive drive for the beam;

Figure 4 is a plan view of the folding device;

Figure 5 is a plan view illustrating the manner of arranging the threads in layers as they pass through the folding device;

Figure 6 is a sectional elevation taken substantially on the line 6—6 of Figure 4, the position of the threads being shown in dotted lines;

Figure 7 is a similar sectional elevation taken on the line 7—7 of Figure 4;

Figure 8 is another sectional elevation through the folding device taken substantially on the line 8—8 of Figure 4; and Figure 9 is a perspective view of strands comprising adhering threads formed in accordance with the present invention.

Referring to the drawings which illustrate one form of apparatus for carrying out the present invention, the numeral 10 indicates spools carrying threads, these spools being grouped so that the threads 11 unwound from the same may pass over a drum 12. Other spools 13 are disposed so that the threads 14 may be unwound from the same and pass around a drum 15 similar to the drum 12. Preferably, these drums 12 and 15 are heated so that the threads in passing over the same will be thoroughly dried. Any of the present methods of heating drums may be employed. As illustrated, steam is introduced to the drums by means of pipes 16, it being understood that the entire details for supplying and exhausting the steam are not illustrated as they are well known in the art. The threads 11 pass from the drum 12 into a receptacle 17 around a guide roller 18 in this receptacle, thence upward and out of the receptacle to a guide roller 19. The receptacle contains a supply of adhesive, and when forming strands for tire fabric this adhesive is a thick rubber dough containing about 20% of gasoline or other hydrocarbon solvent. As this dough is rather thick the threads 11 are liable to carry considerable of the rubber with them when they leave the receptacle. To avoid this and insure that each thread is coated uniformly with rubber the threads 11 just before they emerge from the receptacle pass between a scraper 20 and a roller 21, the periphery of the roller being spaced from the adjacent edge of the scraper to thereby control the coating of the threads.

In a similar manner the threads 14 which pass over the drums 15 are carried through the dough in the receptacle, being guided by the rollers 22 and 23 within the receptacle. From the roller 23, the threads 14 pass between the other scraper 20 and the roller 21 to a guide roller 24. The movement of the threads 11 and 14 through the dough within the receptacle tends to carry the dough with them and pile it up at the points where the threads leave the receptacle. In order to prevent this movement the partitions 25 and 26 are disposed within the receptacle in the positions shown.

After leaving the guide rollers 19 and 24 the threads pass through the folding devices 27, wherein they are arranged in contacting superposed layers thereby forming strands. From the folder the strands pass over the steam heated coils 28, guide rollers 29 being provided, if necessary. This heating means acts to dry the adhesive or rubber. Then the strands may pass around a drum 30 to a beam 31 on which they are wound up. Before being wound on the drum, however, the strands may be subjected to cooling means such as a blast of air. For this purpose a fan or blower 32 discharges into a chamber 33, one wall of which is formed with a plurality of apertures 34 through which air may be discharged against the strands. In order to insure that the strands do not stick together when wound on the beam 31, a roll 35 of muslin or other suitable material is positioned so as to be wound up between the layers of strands on the beam 31. For the purpose of carrying the threads through the apparatus some or all of the rollers above mentioned must be rotated. As shown, a driving pulley 36 is mounted upon a shaft 37 which carries a bevel gear 38. This gear through suitable connections positively drives the drums 12 and 15 and through the shaft 39 which has a bevel gear 40 thereon, rotates a gear 41 meshing with said gear 40. The gear 41 is loosely mounted on the beam shaft 42 and any suitable slip driving conection may be used for communicating rotation from the gear 41 to the beam shaft 42. As shown, a clutch member 43 is adapted to be frictionally engaged with the hub of the gear 41 by means of a spring 44, the tension of which may be varied by the nut 45. The beam 31 is rotatively secured to the shaft 42 in any suitable manner, a set screw 46 being shown. Thus because of the slip drive, the drum 31 will rotate at the proper speed to wind up the strands and also maintain a substantially uniform tension therein. It is obvious that others of the guide rollers may be positively rotated, if desired.

Referring now to Figures 4, 6, 7 and 8, which illustrate one of the folders, it will be seen that this device is substantially trough shaped and comprises a bottom wall 47 and side walls 48. At the entering end, that is, the left hand end, as shown in Figure 4, the walls 48 are flared out in order to properly guide the threads so that they pass from a group of threads in substantially sheet form to the positions illustrated in dotted lines in Figure 6. Intermediate its ends the folder is provided with a guide element 49, the interior surface 50 of which joins the wall and extends adjacent to and spaced from the interior surface of the bottom wall 47, this guiding surface acting to move the threads at one side of the trough as a layer over and against the threads forming the bottom of the trough, the positions being shown in Figure 7. As illustrated in the drawings the guiding element 49 may be formed by bending in a portion of the side wall. Spaced from the guiding element 49 is a similar but oppositely disposed guiding element 51 secured to the opposite side wall. The interior guiding surface of this element is adapted to carry the remaining side wall of the trough of threads over and against the other layers, thus disposing the plurality of threads in superposed contacting layers, as illustrated in Figure 8.

It will be apparent that the threads when they pass over the drum 12, for example, take up a greater space transversely of the apparatus than after they have passed through the folding devices and been arranged in layers. It is for this reason that a plurality of drums like the drum 12 are provided, the number of these drums depending upon the reduction in width when the strands are formed. It is desirable to feed into the apparatus a sufficient number of threads so that the strands when formed will be in substantially lateral contact. Thus when the strands are wound up on the beam they will form continuous layers from end to end thereof, and may be withdrawn therefrom in the loom as warps, that is to say, each strand acts as a single warp thread.

Having thus described the invention what is claimed as new and desired to be secured by Letters Patent is:

1. The method of making strands comprising threads arranged is superimposed layers consisting in passing a plurality of threads through a bath of adhesive and before the adhesive sets arranging the threads in contacting superimposed layers with all the threads extending in the same direction, adjacent threads being in contact and held together by the adhesive the coating of adhesive being only of sufficient thickness to hold the threads in contact with each other.

2. The method of making strands comprising threads arranged is superimposed layers consisting in coating each of a plurality of threads with an adhesive and thereafter before the adhesive sets arranging the threads in contacting superimposed layers with all the threads extending in the same direction, the coating of adhesive being only sufficient to hold the threads in contact with one another.

3. The method of making strands comprising threads arranged in superimposed layers consisting in passing a plurality of threads through a bath of rubber and while the threads are in motion and before the rubber sets arranging them in contacting superimposed layers with all the threads extending in the same direction, the rubber acting to hold the threads together.

4. The method of making strands comprising threads arranged in superimposed layers consisting in coating each of a plurality of threads disposed in a single layer with a thin solution of rubber, and thereafter before the rubber sets arranging the threads in contacting superimposed layers with all the threads extending in the same direction, the coating of rubber being only sufficient to hold the threads together.

5. The method of making strands comprising adhering threads disposed in superposed layers with the threads all extending in the same direction consisting in, coating each of a plurality of threads with an adhesive, arranging the coated threads in a trough or U shape, moving the threads forming one side of the trough as a layer against the threads forming the bottom of the trough and moving the threads forming the other side of the trough as a layer against the other threads.

6. The method of making strands comprising adhering threads disposed in superposed layers with the threads all extending in the same direction consisting in, coating each of a plurality of threads with an adhesive, arranging substantially a third of said threads in a layer, disposing substantially a second third of the threads as a layer against the first layer and disposing the remaining threads as a layer against one of the first layers.

7. Apparatus of the character described comprising in combination, means to coat a plurality of threads with an adhesive, and means to arrange said threads in contacting superposed layers with the threads all extending in the same direction.

8. Apparatus of the character described comprising in combination, means to coat a plurality of threads with an adhesive, means to arrange said threads in contacting superposed layers with the threads all extending in the same direction, and means to dry the coated threads.

9. Apparatus of the character described comprising in combination, means to coat a plurality of threads with an adhesive, means to arrange said threads in contacting superposed layers, means to dry the coated threads, a drum, and means to rotate the drum to wind up the dried superposed layers of threads thereon.

10. Apparatus of the character described, comprising in combination, a receptacle adapted to hold a solution of rubber, a drying device, a drum, means to carry a plurality of threads through the solution in said receptacle, arrange said threads in superposed layers to form strands, carry said strands over the drying device and wind them up on the drum.

11. In apparatus of the character described, a folding device comprising a trough shaped member provided with a guide having a surface joining the interior surface of one side wall and extending adjacent to and spaced from the bottom wall, and a guide on the opposite side wall having a similar surface.

12. In apparatus of the class described, a folding device comprising a bottom wall, a side wall secured thereto, and a guide having a surface joining the interior surface of the side wall and extending adjacent to and spaced from the bottom wall.

13. Apparatus for making strands consisting of threads arranged in superposed layers including, in combination, a tank adapted to contain a solution of rubber, means to guide threads through the rubber solution in said tank, and means to arrange said threads while the rubber is tacky in narrow superposed layers to form strands.

In testimony whereof I affix my signature.

HANS E. GRABAU.